March 9, 1937. K. E. PEILER 2,073,572
FEEDING MOLTEN GLASS
Filed March 10, 1914 3 Sheets—Sheet 3
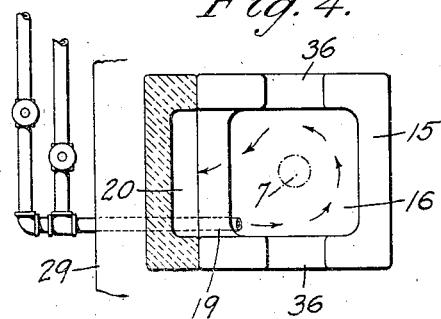
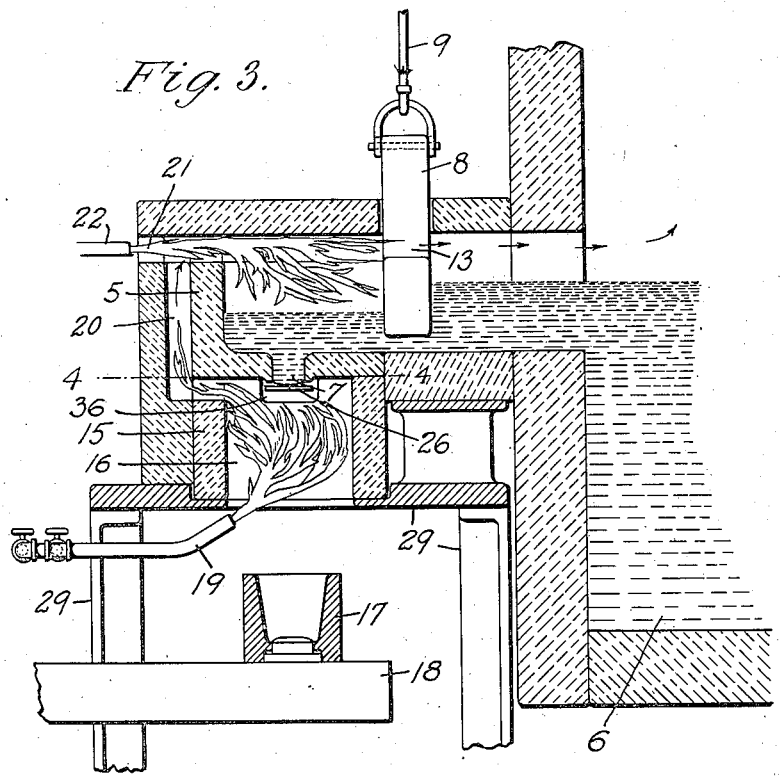
Witnesses:
P. S. Grotta.
Wm A Zeiser
Inventor:
Karl E. Peiler
by Wm H Honiss
Atty.

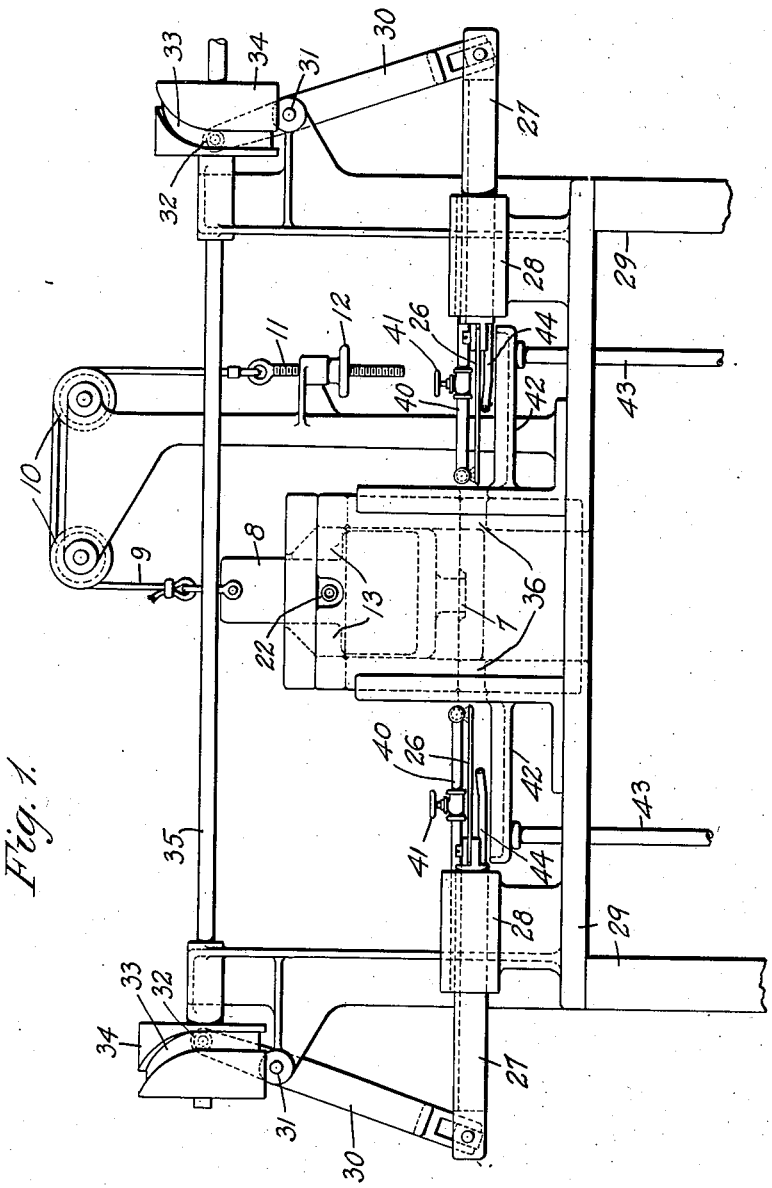

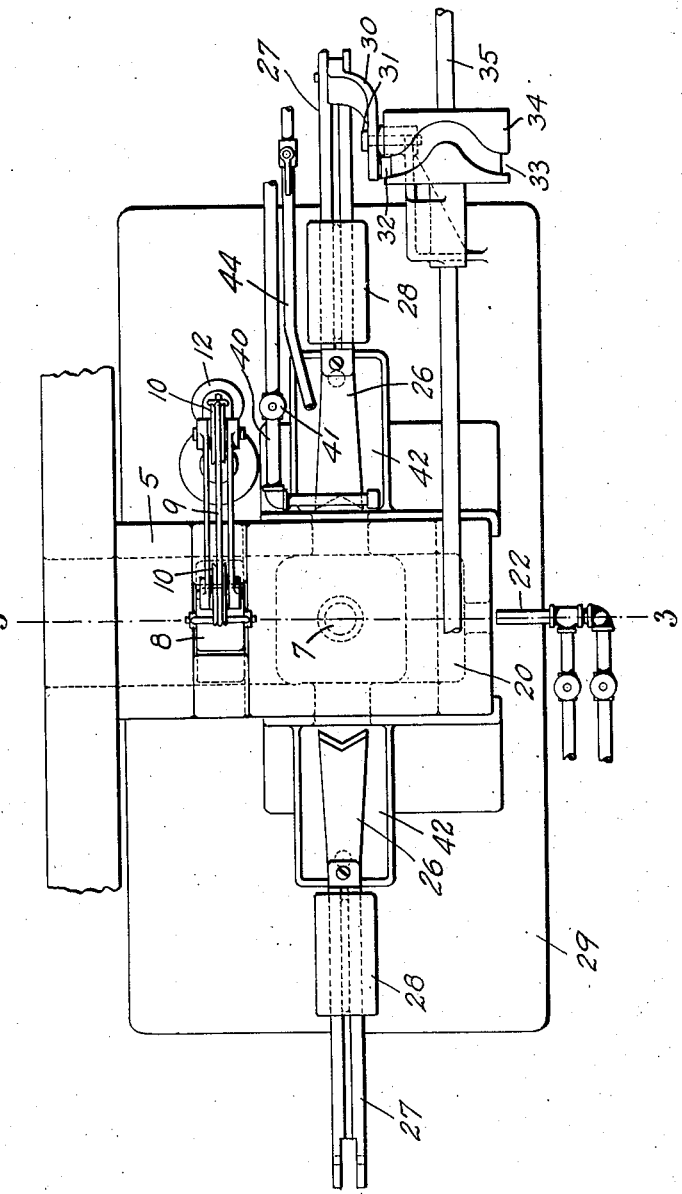

Patented Mar. 9, 1937

2,073,572

UNITED STATES PATENT OFFICE 2,073,572

FEEDING MOLTEN GLASS

Karl E. Peiler, Hartford, Conn., assignor, by mesne assignments, to Hartford-Empire Company, Hartford, Conn., a corporation of Delaware Application March 10, 1914, Serial No. 823,694

33 Claims. (Cl. 49—55)

This invention relates to improvements in methods and apparatus for feeding molten glass and separating it into mold charges suitable for blowing, pressing, or other glass shaping purposes.

In the shaping of molten glass it is generally desirable to work it in a pasty or viscous condition, rather than in a hotter or more liquid state, for various reasons, among which may be mentioned its better adaptability to be gathered and conveyed to the shaping means in a compact and cohesive charge, its greater resistance to penetration by air bubbles, the lessened heating of the molds and other handling or shaping implements, and the shorter time required for the ware to acquire its permanent set after shaping.

This pasty or viscous condition of the glass has been well recognized as being favorable to the hand gathering methods which heretofore have been mainly employed. But in the attempts made to feed the glass by quicker methods and apparatus, better suited to increased production, it has seemed necessary to feed the glass in a hotter and more liquid condition, on account of the difficulties encountered in attempting to feed cooler and more viscous glass by the methods and apparatus heretofore employed. The rapid chilling of the more viscous glass as it reached and emerged from the orifice or outlet through which it flowed, gradually clogged and contracted the orifice or outlet. Moreover, it was found that the more viscous glass could not be divided into mold charges by mere interception, as by the edge of a cup, or other transferring device, but had to be severed positively with shears. The ease of cutting with the shears depended upon the degree of viscosity of the glass. With very hot glass, or if a gas flame was employed to prevent overchilling, the shear blades became heated so that the glass adhered to them, thus creating further difficulty. All of these difficulties increased with the increased rapidity of production.

The object of this invention is to provide a method and means whereby the above mentioned difficulties and others may be overcome, and whereby glass may be fed to rapidly operating shaping machinery in cleanly severed uniform masses or gathers of glass of the proper heat and plasticity for rapid and continuous work.

In accordance with the present invention the viscous glass is flowed from a spout or through an orifice into a heated chamber, the temperature of which is regulated to the desired degree. In the side wall or walls of this chamber is provided an opening or openings through which severing means such as shear blades can be introduced and withdrawn, and outside of the chamber is provided cooling means such as a stream or streams of water for cooling the severing means, during the intervals between its severing operations. Under these conditions the viscous glass flowing from the spout or orifice will form itself into compact masses or gathers momentarily suspended from the orifice or spout and protected by the heat of the chamber against undue chilling. The shear blades in a cooled condition are driven into the chamber and easily and cleanly sever the charges of glass from the suspended masses or gathers, allowing them to drop through the bottom of the chamber into the shaping mold, transfer cup, or other receptacle provided below. The shear blades are immediately retracted through the opening or openings outside of the chamber where they are quickly cooled, without cooling the chamber or the glass.

The drawings illustrate a working embodiment of this invention, which, however, may be varied in many ways within the scope of the appended claims.

Figure 1 of the drawings is a front view of the embodiment referred to, showing the severing shears in their retracted outward position. Fig. 2 is a plan view projected from Fig. 1, some portions of the left hand side of the apparatus being omitted, since they are practically duplicates or paired members of corresponding parts shown on the right hand side of the apparatus. Fig. 3 is a side view in section taken substantially at the plane indicated by the line 3—3 of Fig. 2. Fig. 4 is a plan view in section taken along the line 4—4 of Fig. 3.

This apparatus is herein shown to be appurtenant to a suitable glass melting tank or furnace 6 from which the glass flows along a spout or conduit and out of a suitable orifice or other outlet. As herein shown the conduit 5 is provided with an orifice 7 through which the glass flows or is extruded. The conduit may be arranged so that the glass flows by gravity as herein shown, or its flow may be accelerated, intermitted, and otherwise regulated by suitable paddles or displacers. As herein shown the flow is regulated by an adjustable gate 8 suspended by a cable 9 passing over the pulleys 10 to an adjusting device within reach of the operator, consisting of a screw 11 which may be raised or lowered by a rotatable nut 12 to lower and raise the gate.

The space below the orifice or outlet 7 is surrounded by enclosing walls 15 to form a heat enclosing chamber 16. The bottom of the chamber is open sufficiently to allow the severed charges of glass to fall freely out of the chamber into a suitable transfer cup or other receptacle, which is herein shown as a mold 17 mounted upon a table or platform 18, which may be the work table of a pressing or blowing machine.

The chamber 16 may be heated in various ways. It is herein shown to be heated by a flame from a blow pipe or nozzle 19, which is preferably so disposed as to blow the flame along the inner sides of the walls 15 of the chamber so as to surround the suspended charges of glass with a hot flame, which as shown in Figs. 3 and 4 may pass from the chamber 16 through a flue 20 to the space above the glass in the conduit, along which it may be drawn or blown inwardly to the tank or furnace 6, so as to expend as much as possible of its heat on the glass, and finally to mix its remaining spent gases with the combustion products of the tank. To facilitate the flow and circulation of the gas flame, an additional jet 21 may be directed into the conduit from the nozzle 22. The gate 8 is provided with apertures or is reduced in width, so as to leave openings 13 above the glass level of sufficient area to allow these gas flames to pass through along the course indicated by the arrows in Fig. 3.

The side walls 15 are suitably apertured for the entrance of the severing means employed. The severing devices shown herein consist of oppositely disposed shear blades 26 fixed to suitable slides 27 mounted for horizontal sliding movement in the guides 28, carried by the frame 29 of the machine. These shear slides are shown to be driven by levers 30 pivoted at 31 to the framing, the upper ends of the arms being provided with cam pins or rolls 32 engaging with the cam grooves 33 of the cams 34. These cams are carried by the cam shaft 35, which may be connected with and driven by the glass shaping machine or other machine with which this apparatus may be employed, so as to sever and feed the glass in suitable time for delivery to that machine.

The cam grooves 33 are laid out so as to drive the shear blades inwardly through the apertures 36 into the chamber 16 until the blades meet and sever the suspended charge of glass, after which the shear blades are immediately withdrawn to the position shown in Figs. 1 and 2, in which position they are preferably subjected to the cooling action of sprays of water from pipes 40 regulated by valves 41, by which means the blades are thoroughly cooled during the intervals between their severing operations. Drip pans 42 provided with drain pipes 43 are disposed beneath the shear blades, so as to collect and conduct away the sprayed cooling water.

To assist in protecting the shear blades from the heat of the chamber, passing out through the apertures 36, air nozzles 44, like that shown on the right hand side of Fig. 2 may be employed on both sides, these nozzles being directed at the apertures 36 so as to meet or overcome any tendency of the heated air or flames to pass outwardly through those apertures against or toward the shear blades. The volume and pressure of the air jets may be regulated to the desired degree.

In the operation of this apparatus, the gate 8 is raised by means of the hand wheel or nut 12 far enough to permit a suitable flow of the glass along the conduit 5 under the gate. The glass in the tank or furnace 6 should be maintained at a heat only sufficient to produce the desired viscous condition of the glass, so that the latter as it flows through the orifice 7 will gather and form a more or less compact mass, which holds itself in suspension until the desired amount has accumulated, when it is cut off by the quick inward stroke of the shear blades 26 operated by the cams 34 as above described. These blades, cooled and lubricated by the flow of the cooling water are thus enabled to cut cleanly through the glass without unduly softening the blades, or permitting the glass to stick to them. The shear blades are immediately retracted and cooled in readiness for the next cut, while the severed mass falls into the mold 17 or transfer cup, as the case may be, and is carried away to be shaped or further operated upon, at the same time bringing a new mold or transfer cup into position beneath the orifice, ready for the succeeding charge.

The succeeding masses of molten glass while suspended in the heated chamber and accumulating therein to the size required for the desired charge, are maintained by the heat of the chamber at the required heat and viscosity. That heat also tends to melt the under surface of the charge where cut or chilled by the previous shear action, thus absorbing into each mass whatever roughness of surface may have been caused, and thereby avoiding or minimizing the effect known as "shear scarring" of the ware.

I claim as my invention:—

1. The method of feeding molten glass, which consists in accumulating and suspending masses of the glass in a heated atmosphere, and successively shearing mold charges from the accumulations when such charges have attained the desired size while thus suspended at a plane sufficiently far below the plane of suspension of said masses to prevent smearing of the glass during the shearing of said charges.

2. In apparatus for feeding molten glass for mold charges, a heated chamber, means for flowing, suspending, and accumulating masses of the glass in the chamber, and severing means movable into and out of said chamber.

3. In apparatus for feeding molten glass, the combination of a heated chamber, a substantially enclosed conduit flowing the glass to and suspending it in compact masses in the heated chamber, a passage connecting the said heated chamber with the conduit, and means for circulating a heating medium in the heated chamber around and in contact with the said masses and through the said passage to the conduit.

4. In apparatus for feeding molten glass, the combination of a substantially enclosed conduit flowing the glass and accumulating it in suspended masses, a heated chamber substantially enclosing the suspended masses, a passage communicating from the heated chamber to the said conduit, means for circulating a heating medium in the chamber around and in contact with the said masses, and through the said passage into the said conduit, and means for injecting a heating medium into said conduit to create a draft through the said passage.

5. In apparatus for feeding molten glass in mold charges, the combination of severing means, a wall of refractory material disposed between the severing means and the molten glass, and provided with an aperture for the entrance and retraction of the severing means, and means for cooling the severing portion of the severing means when in its retracted position.

6. In apparatus for feeding molten glass in mold charges, the combination of severing means, a wall of refractory material disposed between the severing means and the molten glass to be severed, and provided with an aperture for the entrance and exit of the severing means, and spraying devices for cooling the severing portion of the severing means when in its retracted position.

7. In apparatus for feeding molten glass in mold charges, the combination of severing means, a wall of refractory material disposed between the severing means and the molten glass to be severed, and apertures for the entrance and exit of the severing means, water spraying devices for cooling the severing means when in its retracted position, and means for receiving and conducting away the excess water.

8. In apparatus for feeding molten glass in mold charges, the combination of severing means, a heat insulating wall disposed between the severing means and the glass to be severed by it, and provided with an aperture for the entrance of the severing means, and an air jet directed at the outer side of said aperture to oppose the effluence of flame or heat through the aperture.

9. In apparatus for feeding molten glass in mold charges, means for flowing and suspending masses of the glass, heat insulating walls disposed on opposite sides of and clear of the flowing glass, and provided with apertures for the entrance of severing means, and severing means disposed outside of the walls, and mounted for movement through the said apertures to sever the glass between the walls.

10. In apparatus for feeding molten glass in mold charges, means for flowing and suspending masses of the glass, coacting shear mechanism disposed on opposite sides of the suspended masses, walls protecting the respective shear mechanism from the heat of the glass, and provided with apertures for the entrance and retraction of the said shear mechanisms, means for applying a cooling medium to the shear mechanisms when in their retracted positions outside of the said walls, and means for directing air jets at the said apertures to oppose the tendency of the flames and heat to issue from said apertures.

11. In apparatus for feeding and separating molten glass into mold charges, the combination of means for flowing and suspending the glass in compact masses, a chamber enclosing the suspended masses, means for regulating the heat of the chamber around the suspended masses, means for severing the succeeding masses when formed, and means for cooling the severing means during the intervals between its severing operations.

12. In apparatus for feeding molten glass in separated mold charges, the combination of a chamber, means for flowing the molten glass to and suspending it in the chamber, severing mechanism disposed outside of said chamber, and movable into the chamber to sever the glass, means for directing a heating flame into the chamber, and a flue for conducting the products of combustion away from the chamber.

13. In apparatus for feeding molten glass in separated mold charges, the combination of a chamber, means for flowing the molten glass to and suspending it in the chamber, severing mechanism disposed outside of said chamber, and movable into the chamber to sever the glass, means for directing a heating flame into the chamber, a flue for conducting the products of combustion away from the chamber, and a gas flame cooperating with the said flue to induce a draft therein from the said chamber.

14. The combination of a heated chamber, means for flowing a stream of glass through said chamber, and means located within the chamber for severing the flowing stream of glass into charges.

15. The combination of a glass furnace having a feed opening, a shearing mechanism for severing into charges the glass from the said opening and located adjacent thereto, a chamber surrounding the said opening and the severing point of the glass issuing from the said opening, and means for heating the said chamber to re-heat the severed end of said glass.

16. The combination with a heating chamber, of a container for plastic glass, having a feed opening adapted to deliver glass into said chamber, means located within said chamber and immediately below the feed opening for severing from the opening molten charges cut from the glass issuing from the said opening.

17. The combination with a chamber, of a container for plastic glass having a feed opening adapted to deliver glass into the said chamber, means located within the said chamber for severing molten charges cut from the glass issuing from the said opening, and means for raising the temperature of said chamber at the point of severing to reheat the severed end of said glass.

18. The method of forming separated mold charges from a parent body of glass which consists of flowing the glass under a constant pressure through an aperture in the bottom of a container holding the parent body, the lower end of the aperture being heated, and severing the glass by mechanical shears below and out of contact with the aperture, the viscosity of the glass in the container and the time of severance being so related that the glass is severed before it breaks into stream form.

19. The method of feeding molten glass from a parent body in a succession of uniform compact mold charges, that comprises discharging glass downwardly through a submerged outlet completely encircling the glass, periodically and at selected equal intervals of time shearing mold charges from the discharged glass at a plane spaced from and beneath the outlet by the simultaneous action of four shear faces which embrace the glass concentrically around the axis of the outlet and out of smearing relation with the outlet to shear the glass and are retracted immediately upon the completion of the shearing operation, and so regulating the temperature of the glass to control its viscosity and the pressure effective to discharge the glass through the outlet relatively to the periodicity of shearing that the discharging glass passes from the outlet into a state of temporary suspension in successive compact masses, each of which is subjected to the said shearing operation prior to any substantial contact of said mass with an undersupport.

20. In apparatus for feeding molten glass, the combination of means for severing the glass including individually mounted cooperating shear members arranged to move toward and away from the glass to be severed, and a heated chamber having walls normally interposed between the molten glass and the shear members, said walls being provided with apertures for the entrance and retraction of the shear members.

21. In apparatus for feeding molten glass in mold charges, the combination of severing means including individually mounted cooperating shear members, a heated chamber having walls of refractory material normally disposed between the shear members and the molten glass, said walls being provided with apertures for the entrance and retraction of the shear members, and means for cooling the severing portion of the shear members when in their retracted position.

22. In apparatus for feeding molten glass in mold charges, the combination of severing means, a heat insulating wall disposed between the severing means and the glass to be severed by it, and provided with an aperture for the entrance and retraction of the severing means, and a fluid jet directed at the outer side of said aperture to oppose the effluence of flame or heat through the aperture, and to cool the severing means.

23. In apparatus for feeding molten glass for mold charges, a heated chamber, means for flowing, suspending and accumulating masses of the glass in the chamber, severing means movable into and out of said chamber, and means for applying a cooling fluid to the exterior of the severing means while out of the chamber.

24. The method of feeding molten glass from a parent body in a succession of similar mold charges that comprises flowing glass downwardly from the parent body through a submerged outlet completely enclosing the issuing glass, the glass being in a condition suitable for working, and such that a compact mass of glass at least equal to a mold charge is accumulated by suspension of the issuing glass below the outlet, and shearing a mold charge from the parent mass by simultaneous action of four shear edges at a plane sufficiently far below the outlet to prevent smearing of the glass, retracting such members immediately upon the completion of the severing and repeating the severing operations.

25. The method of feeding molten glass from a parent body in a succession of uniform compact mold charges, that comprises discharging glass downwardly through a submerged outlet completely encircling the glass, periodically and at selected equal intervals of time shearing mold charges from the discharged glass at a plane spaced from and beneath the outlet by the simultaneous action of four shear edges which embrace the glass to shear the glass out of smearing relation with the outlet and are retracted immediately upon the completion of the shearing operation, and so regulating the temperature of the glass to control its viscosity and the pressure effective to discharge the glass through the outlet relatively to the periodicity of shearing that the discharging glass passes from the outlet into a state of temporary suspension in successive compact masses, each of which is subjected to the said shearing operation prior to any substantial contact of said mass with an undersupport.

26. Apparatus for feeding molten glass, including a forehearth provided with a discharge outlet below the surface level of the glass for flowing, accumulating and suspending masses of glass below the outlet, a chamber enclosing the outlet, shears movable into and out of said chamber, and means for opening and closing said shears.

27. Apparatus for feeding molten glass, including a forehearth provided with a discharge outlet below the surface level of the glass, a chamber enclosing the outlet, means for heating the chamber, shears movable into and out of said chamber, mechanism outside of the chamber for operating the shears, and means for cooling the shears, outside of the chamber.

28. The method of conditioning molten glass for use in glassware fabricating apparatus, which comprises flowing the glass from a melting tank through a spout having a delivery orifice therein, subjecting the glass in the spout to a temperature-modifying medium, suspending the discharged glass in successive masses from the orifice, periodically severing mold charges from the suspended masses by shears closed below and out of smearing relation with the outlet and applying an enclosed flame to the walls of the orifice and to the glass in said orifice.

29. The method of feeding glass in mold charges delivered en masse to receptacles, comprising discharging glass suitable for suspended charge feeding downwardly and suspending it in successive masses from the bottom of a container, severing a mold charge from each mass before the lower end of the mass contacts with any solid undersupport, removing the severing means after each severing operation, and applying to the stub left after each severing operation an upwardly moving stream of gas in a state of combustion.

30. The method of delivering gathers of fused glass from a melting furnace, melting container, or the like, through a submerged outlet thereof, said method comprising the steps of maintaining the temperature of glass to be fed through the outlet adequately low to preclude the direct formation of a freely flowing glass current and to maintain such a state of viscosity in the glass that a volume of glass roughly corresponding to the gather to be delivered, collected by the outlet of the melting furnace, container or the like, is allowed to hang down and adapted to be cut off before such gather breaks off or continues flowing, and severing such gather by mechanical shears closed to cut through the glass below and out of smearing relation with the outlet while said gather hangs down and before it continues flowing.

31. The method of feeding molten glass from a submerged discharge outlet in the bottom of a container in periodically severed compact mold charges, comprising the steps of controlling the temperature and viscosity of the glass as it passes to the outlet and regulating the rate of flow of the glass through the outlet to cause glass to issue from the outlet at such rate and in such condition that a compact mass comprising enough glass for the desired mold charge will accumulate in suspension below the outlet between successive charge severing operations, and severing mold charges from the successive suspended masses by causing shear blades to cut cleanly through each suspended mass at a plane spaced sufficiently below the outlet to be out of glass smearing relation therewith, the viscosity of the glass flowing to the outlet, the rate of flow through the outlet, and the periodicity and rate of the charge severing operations of the shears all being selected and regulated with relation to one another for co-action to cause the accumulation in suspension of mold charge masses of suitable size and consistency before the respective severing operations and the severance from the suspended masses, at the proper times for proper delivery to the molds of an associate glassware fabricating machine, of compact uniform mold charges, each having a weight appropriate for the mold to be fed and each being of suitable viscosity and condition for shaping in the mold for the production of a practically perfect article of hollow glassware.

32. The method of delivering separated glass gathers from a furnace or other receptacle, the glass issuing from a downwardly directed outlet of said receptacle, which comprises the steps of regulating the heat in the receptacle to maintain the glass issuing from the outlet at the required viscosity to collect in free suspension below the outlet to form the desired gather before the same breaks into a stream, severing the suspended gather before it breaks into a stream by mechanical shears closed to cut the glass out of smearing relation with the outlet, and reheating the glass that is chilled by the contact of the severing means therewith by heat extraneous to and independent of the heat in the furnace.

33. The method of delivering separated glass gathers from a furnace or other receptacle, the glass issuing from a downwardly directed outlet of said receptacle, which comprises the steps of regulating the heat in the receptacle to maintain the glass issuing from the outlet at the required viscosity to collect in free suspension below the outlet to form the desired gather before the same breaks into a stream, severing the suspended gather before it breaks into a stream by mechanical shears closed to cut the glass out of smearing relation with the outlet, and providing an envelope of heated gaseous fluid about the suspended gather and the glass left after severance to reheat the glass chilled by the severing means by a heat extraneous to and independent of the heat of the furnace.

KARL E. PEILER.